Patented Apr. 24, 1951

2,549,767

UNITED STATES PATENT OFFICE 2,549,767

INTERPOLYMER FORMED FROM MONO-VINYLAROMATIC POLYMER, DRYING OIL OR ACID, POLYHYDRIC ALCOHOL, AND POLYBASIC ACID

Edward G. Bobalek, Cleveland, Ohio, assignor to The Arco Company, Cleveland, Ohio, a corporation of Ohio No Drawing. Application June 2, 1947, Serial No. 751,967

8 Claims. (Cl. 260—22)

The present invention relates to a novel type of resinous interpolymer, and is more particularly concerned with the product formed from the reaction of (a) an at least partially conjugated drying oil fatty acid or ester, (b) an oil-soluble polymer of a monovinylaromatic compound, (c) a polyhydric alcohol, and (d) a polybasic acid. The invention is further concerned with a method for the production of the said interpolymer, and to surface-coatings embodying the said polymerization product.

It has previously been proposed to incorporate styrene into a surface-coating according to various procedures. Such methods have, for example, included the polymerization of styrene in the presence of a drying oil, a resin, or a cellulosic film-forming material (U. S. Patent 1,975,959). Other methods of incorporating styrene into a surface-coating have likewise been suggested, and products produced therefrom have exhibited, in certain instances, at least some improvement over the ordinarily employed types of surface-coatings. However, it has not previously been suggested to prepare an interpolymer such as that of the instant application.

The interpolymer of the present invention is produced by the interpolymerization of from about 40 to 60 per cent by weight of an at least partially conjugated drying oil fatty acid or ester, from 5 to 15 per cent by weight of an oil-soluble polymer of a monovinylaromatic compound, from about 15 to 25 per cent of a polyhydric alcohol, and at least a portion of a polybasic acid. The resinous product has a sufficiently low acid value to allow employment thereof with reactive pigments and aminoaldehyde resins. The interpolymer, when in solution in any of the commonly employed varnish or paint solvents, show superior color and clarity, and films formed therefrom exhibit excellent water- and alkali-resistance as compared with ordinary oil-modified glyceryl phthalate resins. The resin lends great durability to paints and varnishes embodying the same, especially from the standpoint of maintenance of adhesion and resistance to checking under conditions of atmospheric exposure.

By "monovinylaromatic compound" as employed in the present specification is meant any compound containing at least a phenyl or naphthyl radical in combination with a vinyl group, and otherwise structurally similar to styrene. The phenyl group may contain substituents as, for example, fluorine, chlorine, methoxy, hydroxy, methyl, trichloromethyl, or trifluoromethyl. As representative compounds included within the scope of "monovinylaromatic compound" may be mentioned styrene itself, para-methylstyrene, para-chlorostyrene, para-fluorostyrene, meta-chlorostyrene, meta-fluorostyrene, meta- and para-trichloromethylstyrene, meta- and para-trifluoromethylstyrene, ortho- and meta-hydroxystyrene, methoxystyrenes, vinyl-naphthalene, and the like. Substituents may also be present on the vinyl group, as in alpha-methylstyrene, but of course not in a manner such as to retard polymerization. Especially preferred monovinylaromatic compounds are styrene itself and derivatives thereof.

The at least partially conjugated drying oil fatty acid or ester may be any one of the at least partially conjugated drying oils, which usually exist chiefly as the glycerides of certain complex unsaturated straight-chain organic acids, the oil fatty acids themselves, or synthetic esters of the drying oil fatty acids. The conjugated drying oil or acid, to be operative in the method of the present invention, should have an average double bond content and degree of conjugation, as determined by average iodine number and diene number, the former being the experimental measure of unsaturation and the latter being the experimental measure of conjugated unsaturation, according to specifications published by J. D. von Mikusch and Charles Frazier, Ind. Eng. Chem. Anal. Ed. 13, 782–789 (1941); 15, 109–113 (1943), at least as great as that of dehydrated castor oil (a minimum of approximately 133 and 33 Woburn) and not in excess of that for beta-eleostearic acid (approximately 274 and 91 Woburn). As ordinarily obtained from commercial sources, the drying oils consist chiefly of glycerides of the drying oil fatty acids, which acids may be liberated from the oils by saponification and acidulation of separated acid salts. The oil acids thus obtained may, if desired, be esterified with monohydric or polyhydric alcohols according to usual esterification procedures. These esters are usually referred to as synthetic drying oil esters, and are similar to the natural oil in many respects. Ordinarily, these natural fatty acid glyceride esters, the natural drying oil fatty acids, or various synthetic esters of the same, are processed by commercial suppliers according to various procedures which effect an average double bond content and degree of conjugation such as to render the processed oils or acids suitable for employment in the present invention. Either the oil, the acid, or synthetic esters may be employed in the method of the present invention. Mixtures of drying oils, or of oils with acids, may also be employed, but, whether in the pure or mixed state, the requirement for conjugation remains the same. Drying oils and acids having a greater or lesser average double bond content than that prescribed above are unsuited for use, and, if the necessary conjugation is not present in the oil or acid as introduced into the reaction zone, then heating or other reaction conditions must be sufficient to produce the same therein. As representative drying oils and acids which may be employed, for example, are dehydrated castor oil, conjugated linseed oil fatty acids, isomerized walnut oil, conjugated soya oil, tung oil, and blends of these highly conjugated oils and acids with oils such as soya and linseed.

The specifications of a typical oil fatty acid which may be advantageously employed in the preparation of the resin of the present invention are as follows:

1. Iodine No. _____ 143–153 (WIJS)
   178–187 (Woburn)
2. Color _____ 1–2
3. Acid No. _____ 197.5 to 199
4. Saponification No. _____ 198.5 to 199.5
5. Ester value _____ 0–1.5
6. Hexabromide value _____ 0–3
7. WIJS on ice for 3 minutes Iodine value. 115–120 (62–73 Woburn)
8. Conjugation (by difference). 60–65
9. Titre value _____ 18–24
10. Spec. gravity _____ 0.9201 at 25° C.
11. Viscosity _____ A+ to F (Gardner-Holdt scale at 77° F.)

By a "polyhydric alcohol," as employed herein, is intended any polyhydric alcohol containing at least three hydroxyl groups in the molecule, for example, glycerol, pentaerythritol, polyallyl alcohol, mannitol, sorbitol, erythritol, trimethylol propane, and similar other alcohols containing at least three hydroxyl groups. The amount of polyhydric alcohol employed is usually between about 15 to 25 per cent of the total weight of starting reactants, and is always in excess of that amount theoretically required to neutralize all carboxyl groups in the starting reactants.

As polybasic acid in the present invention may be employed any polybasic acid or the anhydride thereof, such as the dibasic acids malonic, succinic, glutaric, adipic, sebacic, maleic, itaconic, methylmalonic, perfluoroglutaric, perfluoroadipic, and phthalic; tribasic acids such as 1,2,4-butane-tricarboxylic acid, and the like. At least a portion of a polybasic acid must always be added, and, for the production of the most desirable product, sufficient of the polybasic acid should be added to render the ratio of hydroxyl groups to carboxyl groups in the starting reactants between about 1.1 and 2.0 to 1, preferably between about 1.1 and 1.6 to 1. This ratio allows the polybasic acid to react with the required excess of polyhydric alcohol, effecting considerable of the highly desirable cross linkage.

The principle of the present invention is not restricted to the employment of any particular oil-soluble monovinylaromatic compound, but rather contemplates the use of any oil-soluble polymer of a monovinylaromatic compound in amount between about 5 and 15 per cent by weight of the starting reactants. Such a polymer is ordinarily of a rather low average molecular weight, but as long as the polymer, which usually exists as a mixture of polymers of varying molecular weights, be oil-soluble, the exact molecular weight is of little significance. A satisfactory test of a particular monovinylaromatic polymer, to determine its suitability for employment, is to admix 15 parts thereof with 100 parts of dehydrated castor oil and to heat the mixture at an elevated temperature. This amount of polymer should go into solution in the oil at elevated temperatures and should not separate out upon cooling. Other entirely satisfactory tests may be devised, and to state that the monovinylaromatic polymer should be oil-soluble should suffice to inform one skilled in the art. It is to be understood, also, that the oil-soluble polymer of the monovinylaromatic compound need not be of an entirely pure nature, as mixtures of oil soluble monovinylaromatic polymers may be employed successfully, as well as oil-soluble polymers of a monovinylaromatic compound containing minor proportions of modifying resins, or chemical inhibitor agents which limit the molecular weight of the monovinylaromatic compound polymer. These modifying resins and inhibitors should ordinarily not exceed about 15 per cent of the weight of the monovinylaromatic polymer. Representative polymers which have been found especially suitable are oil-soluble polystyrenes, oil-soluble phenolic-modified polystyrenes, oil-soluble poly(alpha-methyl)styrenes having an average molecular weight between about 350 and 800, mixtures of the foregoing, phenolic modified poly(alpha-methyl) styrenes, and the like. Others which may be employed are modified or unmodified oil-soluble polymers of any of the previously mentioned monovinylaromatic compounds. Some of these polymers are available commercially, while others can be prepared by polymerization of the desired monomer by conventional procedure to any extent within the prescribed range of oil-solubility.

In carrying out the method of the present invention, (1) from about 40 to 60 per cent by weight of an at least partially conjugated drying oil fatty acid or ester, (2) from about 5 to about 15 per cent by weight of an oil-soluble polymer of a monovinylaromatic compound, (3) a polyhydric alcohol in excess of that amount theoretically required to neutralize all carboxyl groups in the starting reactants, and (4) a polybasic acid, may be heated together at a resin-forming temperature until attainment of an acid value below about 30, preferably below about 10. The reaction may be continued to any desired extent, but should always be checked short of the point at which the reaction product undergoes gelation. The reactants are usually heated together in admixture at a temperature between about 190 and 260 degrees centigrade, preferably between about 200 and 250 degrees centigrade, and in the presence of an esterification catalyst such as litharge or calcium stearate. When carried out in the temperature range given above, the reaction usually demands a period between about three and six hours, and suitable resin-forming temperatures higher or lower than the above correspondingly affect the time required. A convenient manner of checking the reaction short of gelation is by dilution of the resin to a solution of about 50 per cent non-volatile solids in a solvent such as xylene or a petroleum hydrocarbon fraction having a boiling range between about 150 and 200 degrees centigrade.

While the alcohol and polybasic acid may be introduced into the reaction simultaneously or in admixture, certain advantages accruing to the employment of specific procedures when operating with different types of reaction ingredients are somewhat preferable. Therefore, when less than about two-thirds of the oil and/or oil fatty acid portion of the reaction mixture consists of oil acid portion of the reaction mixture consists of oil fatty acids, it is advantageous to heat the polyhydric alcohol together with the oil reactant, either alone or in the presence of the monovinyl-aromatic polymer, for a short time before addition of the polybasic acid. However, when the oil and/or acid portion of the reaction mixture consists of more than about two-thirds oil fatty acids, no advantage is gained by employment of such procedure, and the polyhydric alcohol and polybasic acid are usually introduced into the reaction at the same time.

The preliminary heating of drying oil and polyhydric alcohol is usually at a temperature between about 130 and 250 degrees centigrade, usually for a period of between about one-half and one hour, and may be considered complete when one part of the reaction mixture, prior to the addition of polybasic acid, is soluble in two parts of methanol by volume. Upon the expiration of this period of preliminary heating, the polybasic acid may be added directly and the reaction continued at any suitable resin-forming temperature, usually between about 200 and 260 degrees centigrade, in the same manner as when the polyhydric alcohol and polybasic acid are added together, during which reaction period a current of carbon dioxide is passed through the reaction mixture to promote removal of the water of esterification.

When the polyhydric alcohol and polybasic acid are introduced into the reaction at the same time, as is usually the practice when drying oil fatty acids make up at least about two-thirds of the drying oil fatty acid or ester portion of the reaction mixture, the temperature may be maintained at any level within the usual range for the formation of a resin, e. g., 130–260 degrees centigrade, usually between about 190 and 260 degrees centigrade, until the acid number of the resin is below about 30 and preferably below about 10, but always short of the point at which gelation of the resin occurs. This usually demands a time period of about two to six hours when carried out within the range given above, and may be conveniently checked short of gelation by dilution to a solution of about 50 per cent non-volatile solids in a suitable solvent.

The polyhydric alcohol in the starting reaction mixture is always in excess of that amount theoretically required to neutralize all of the carboxyl groups in the starting reactants, and ordinarily comprises from about 15 to 25 per cent by weight of the starting reactants. Whether the polyhydric alcohol and polybasic acid are introduced into the reaction mixture simultaneously or at different times, the relative proportions of these reactants are chosen so that the total number of carboxyl groups in the reaction assumes a ratio betwen about 1.1 and 2.0 to 1, and preferably 1.1 and 1.6 to 1.

If desired, solvents such as toluene, xylene, dipentene, or moderately low-boiling aliphatic hydrocarbons may also be incorporated into the reaction mixture, and the reaction conducted under temperature conditions regulated according to the maximum volume of reflux which can be controlled in the particular apparatus employed. The reaction container, may, for example, be provided with a reflux condenser having a receiver whereby the mixed solvent-water condensate is collected and whereby the separated water may be withdrawn while the solvent is returned to the reaction container at a rate sufficient to replace the quantity removed by distillation. In such operation, carbon dioxide or other inert gas may be used as a protective blanket to inhibit oxidation. The fusion process first given is, however, preferred, inasmuch as the process involving the employment of a solvent is not generally productive of a product having such desirable characteristics as that produced by the fusion method.

The following examples illustrate the method of the present invention, but are not to be construed as limiting.

*Example 1*

A low molecular weight oil-soluble resin consisting in greater part of drying oil soluble polymeric styrene may be prepared as follows:

A mixture of 570 grams of monomeric styrene and 30 grams of para-phenylphenol formaldehyde resin were introduced into a three-neck, one-liter flask provided with reflux condenser, agitator, and thermometer. The reaction mixture was brought to a temperature of 120–130 degrees centigrade and maintained at this level until a homogeneous solution was obtained. Heating was then discontinued, and a catalyst comprising a mixture of 0.5 gram of boric acid and 0.5 gram of oxalic acid was added to the styrene-phenolic solution. The resulting exothermic reaction was controlled by cooling the flask in a water bath in such a manner as to maintain the reaction temperature always below about 145 degrees centigrade. When the exothermic reaction had subsided, the reflux condenser was removed and the viscous reaction product maintained at a temperature of 215 degrees centigrade for a period of about one hour, while the remaining volatile matter was blown from the resin with a current of carbon dioxide. The resin was then poured into a shallow dish to freeze into a pale-colored, brittle, thermoplastic solid. This polystyrene resin was found suitable for employment in the process of the present invention.

*Example 2*

Sixty grams of the phenolic-modified polystyrene from Example 1 and 200 grams of conjugated linseed oil fatty acids were admixed in a three-neck, one-liter flask provided with an agitator, a thermometer, and a means of blowing carbon dioxide through the reaction mixture, at a temperature of about 160 degrees centigrade. Eighty grams of pentaerythritol, 69 grams of phthalic anhydride, and 0.5 gram of litharge were then added, and the reaction mixture maintained at a temperature between about 235 and 250 degrees centigrade for three hours. The product at this point had an acid value of less than ten, and the reaction was checked by dissolving the resin in xylene to produce a sixty per cent solution of non-volatile solids having a viscosity of E-G on the Gardner-Holdt scale at 77 degrees Fahrenheit.

Films drawn from the resin and baked for one-half hour at 250 degrees Fahrenheit were tough and durable, especially in their maintenance of adhesion and resistance to checking under conditions of atmospheric exposure, as well as in their water- and alkali-resistance as compared with common oil-modified glyceryl phthalate resins.

Example 3

A mixture of 4050 grams of dehydrated castor oil, 900 grams of oil-soluble poly(alpha-methyl)-styrene resin having an average molecular weight between about 400 and 800, 1800 grams of pentaerythritol, and 0.3 gram of litharge were reacted together for a period of about one hour at about 230 degrees centigrade in a five-gallon aluminum kettle, fitted with mechanical stirrer, air-cooled condenser, and a means of blowing carbon dioxide through the mixture. At the end of this time, when one part of the reaction mixture was soluble in two parts of methanol, 2250 grams of phthalic anhydride was added and the temperature maintained at 215 degrees centigrade until the acid value was less than ten. The time required to attain the desired acid value was about five hours after the addition of phthalic anhydride, and the reaction was checked at this point by dissolving the resin in an equal weight of xylene to give a 50 per cent solution of non-volatile solids having a viscosity greater than S on the Gardner-Holdt scale at 77 degrees Fahrenheit.

Films prepared from this resin were very similar to those drawn from the resin of Example 1, exhibiting even greater durability and additional toughness.

Example 4

The procedure of Example 2 is repeated, employing instead of the polystyrene a low molecular weight oil-soluble poly(alpha-methyl)styrene. The product is similar to that obtained from the employment of polystyrene itself and is an excellent paint or varnish base from the standpoint of toughness, durability, and adhesion of films formed therefrom.

As previously stated, the resinous product of the present invention, when in solution in any commonly employed solvent, shows superior color and clarity, and films drawn therefrom exhibit excellent water- and alkali-resistance as compared with ordinary oil-modified glyceryl phthalate resins. The resin is especially retentive of adhesive qualities and resistant to checking and external exposure when in the form of either paint or varnish films.

Coating compositions prepared from the polymer of the present invention and a number of driers, pigments, and resins are especially suitable for employment as varnishes and baking enamels, inasmuch as films formed therefrom exhibit excellent toughness, durability, and resistance to alkali, water, and exposure. Driers which may be advantageously incorporated with the interpolymer are metallic naphthenates, such as cobalt, magnese and lead. As pigments that may be used in the said coatings may be mentioned titanium dioxide, zinc oxide and iron blue. Among the resins which may be advantageously employed in combination with the interpolymer of the present invention, an oil-soluble phenol-aldehyde resin melamine or urea resin, pentaerythritol esters of rosin, ester gum, and, in general, any other hard varnish resins are frequently desirable in effecting minor modifications of film properties. Such a resin is preferably employed in a minor proportion, e. g., in amount up to about 30 per cent by weight of the mixture.

For the preparation of surface coatings from the interpolymer of the present invention, the resin may be diluted to any desirable extent with a common varnish solvent, mineral spirits and xylene being somewhat preferred. The concentration should usually be between about 50 and 60 percent of non-volatile solids, and films produced from such solutions have been found especially desirable. The exact concentration employed is not significant, however, as it has been found that variation of the solids content over a resonable range does not materially affect the superior quality of the films.

Various modifications may be made in the invention without departing from the spirit or scope thereof, and it is to be understood that I limit myself only as defined in the appended claims.

I claim:

1. The product of claim 7, wherein the monovinylaromatic oil-soluble polymer (b) is polystyrene.

2. The process of claim 8, wherein the monovinylaromatic oil-soluble polymer (b) is polystyrene.

3. The process of claim 8, wherein a drying oil is employed, and wherein the polyhydric alcohol (c) is heated together with the drying oil (a) and monovinylaromatic polymer (b) prior to introduction of monomeric polybasic acid (d) into the reaction mixture.

4. The process of claim 3, wherein the polyhydric alcohol (c), monovinylaromatic polymer (b) and drying oil (a) are heated together at a temperature between 130 and 250 degrees centigrade, and wherein the reaction is maintained at a temperature between 190 and 260 degrees centigrade after the addition of the monomeric polybasic acid (d).

5. The product of claim 7, wherein the monovinylaromatic oil-soluble polymer (b) is poly-(alpha-methyl)styrene.

6. The process of claim 8, wherein the monovinylaromatic oil-soluble polymer (b) is poly-(alpha-methyl)styrene.

7. An ungelled resinous interpolymer formed by polymerization of from 40 to 60 percent by weight of (a) a compound selected from the group consisting of drying oils and drying oil fatty acids having an average Woburn iodine number between about 133 and 274 and an average Woburn diene number between about 33 and 91, (b) from about 5 to 15 percent by weight of an oil-soluble polymer of a monovinylaromatic compound selected from the group consisting of styrene, vinylnaphthalene, fluorostyrene, chlorostyrene, methoxystyrene, hydroxystyrene, methylstyrene, trichloromethylstyrene, trifluoromethylstyrene, and alpha-methylstyrene, said monovinylaromatic polymer consisting of at least 85 percent by weight of polymerized monovinylaromatic compound monomer, the remainder being (c) a polyhydric alcohol containing as sole functional groups at least three and not more than six hydroxyl groups per molecule, and (d) a monomeric polybasic organic acid selected from the group consisting of saturated and unsaturated polybasic acids containing carboxyl groups as sole functional groups, the relative proportions of (c) and (d) being such as to render the ratio of hydroxyl groups to carboxyl groups in the starting reactants between about 1.1 and 2.0 to 1, the said interpolymer having an acid value below 30.

8. The process for the preparation of a resinous interpolymer which includes the step of polymerizing, by heating together at a resin-forming temperature between about 130 and 260 degrees centigrade (a) from about 40 to 60 percent by weight of a compound selected from the group consisting of drying oils and drying oil fatty acids having an average Woburn iodine number between about 133 and 274 and an average Woburn diene number between about 33 and 91, (b) from about 5 to 15 percent by weight of an oil-soluble polymer of a monovinylaromatic compound selected from the group consisting of styrene, vinylnaphthalene, fluorostyrene, chlorostyrene, methoxystyrene, hydroxystyrene, methylstyrene, trichloromethylstyrene, trifluoromethylstyrene, and alpha-methylstyrene, said monovinylaromatic polymer consisting of at least 85 percent by weight of polymerized monovinylaromatic compound monomer, the remainder being (c) a polyhydric alcohol containing as sole functional groups at least three and not more than six hydroxyl groups per molecule, and (d) a monomeric polybasic organic acid selected from the group consisting of saturated and unsaturated polybasic acids containing carboxyl groups as sole functional groups, the relative proportions of (c) and (d) being such as to render the ratio of hydroxyl groups to carboxyl groups in the starting reactants between about 1.1 and 2.0 to 1, until the attainment of an acid number less than about 30 in the reaction product.

EDWARD G. BOBALEK.

REFERENCES CITED

The following references are of record in the file of this patent:

UNITED STATES PATENTS

| Number | Name | Date |
|---|---|---|
| 2,457,769 | Arvin et al. | Dec. 28, 1948 |

FOREIGN PATENTS

| Number | Country | Date |
|---|---|---|
| 375,320 | Great Britain | June 20, 1932 |